(12) United States Patent
Banikazemi et al.

(10) Patent No.: US 10,061,744 B2
(45) Date of Patent: Aug. 28, 2018

(54) USING RDMA FOR FAST SYSTEM RECOVERY IN VIRTUALIZED ENVIRONMENTS

(71) Applicant: International Business Machines Corporation, Armonk, NY (US)

(72) Inventors: Mohammad Banikazemi, New York, NY (US); John Alan Bivens, Ossining, NY (US); Michael R. Hines, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 14/858,353

(22) Filed: Sep. 18, 2015

(65) Prior Publication Data

US 2016/0012009 A1    Jan. 14, 2016

Related U.S. Application Data

(63) Continuation of application No. 13/933,701, filed on Jul. 2, 2013, now Pat. No. 9,146,819.

(51) Int. Cl.
*G06F 11/00* (2006.01)
*G06F 15/173* (2006.01)
(Continued)

(52) U.S. Cl.
CPC .... *G06F 15/17331* (2013.01); *G06F 11/1407* (2013.01); *G06F 11/1469* (2013.01);
(Continued)

(58) Field of Classification Search
CPC ...................... G06F 11/1407; G06F 15/17331
(Continued)

(56) References Cited

U.S. PATENT DOCUMENTS 7,418,487 B2    8/2008  Andreas
7,681,075 B2 *  3/2010  Havemose .......... G06F 11/1482
                                                    714/11
(Continued)

OTHER PUBLICATIONS

Vaidyanathan et al.; "Exploiting RDMA Operations For Providing . . . Cluster-Based Servers", Cluster Computing, IEEE International Conf. on, Sep. 25-28, 2006, pp. 1-10.
(Continued)

*Primary Examiner* — Dieu-Minh Le
(74) *Attorney, Agent, or Firm* — Scully, Scott, Murphy & Presser, P.C.; Jennifer Davis, Esq.

(57) ABSTRACT

A method, system and computer program product are disclosed for recovery in a virtualized environment using remote direct memory access (RDMA). In one embodiment, the method comprises operating a virtual computer system on a physical computer system, and the virtual system maintains in a memory area a record of a state of the virtual system. In this method, when defined error conditions occur on the virtual system, RDMA is used to pull the record of the state of the virtual system from that memory area onto a standby computer. This record on the standby computer is used to re-initialize the virtual computer. Embodiments of the invention provide methods that provide a very fast recovery from a virtual machine fault or error, while requiring much fewer resources than standard approaches. In embodiments of the invention, one spare real computer system can be used for backing up several virtual systems.

15 Claims, 4 Drawing Sheets

(51) Int. Cl.
*G06F 11/16* (2006.01)
*G06F 11/20* (2006.01)
*G06F 11/14* (2006.01)

(52) U.S. Cl.
CPC ...... *G06F 11/1484* (2013.01); *G06F 11/1658* (2013.01); *G06F 11/203* (2013.01); *G06F 11/2038* (2013.01); *G06F 11/2097* (2013.01); *G06F 11/2048* (2013.01); *G06F 2201/815* (2013.01); *G06F 2201/84* (2013.01)

(58) Field of Classification Search
USPC .......................................... 714/4.4, 4.1, 6.31
See application file for complete search history.

(56) References Cited

U.S. PATENT DOCUMENTS

| | | | |
|---|---|---|---|
| 7,818,616 B2 | 10/2010 | Kathail et al. | |
| 7,917,597 B1 | 3/2011 | Lentini | |
| 7,953,085 B2 | 5/2011 | Chang et al. | |
| 8,006,169 B2 | 8/2011 | Biran et al. | |
| 8,023,417 B2 | 9/2011 | Blackmore et al. | |
| 8,117,153 B2 | 2/2012 | Cattell et al. | |
| 8,131,814 B1 | 3/2012 | Schlansker et al. | |
| 8,161,126 B2 | 4/2012 | Fan | |
| 9,146,819 B2 * | 9/2015 | Banikazemi | G06F 11/1658 |
| 2005/0132250 A1 | 6/2005 | Hansen et al. | |
| 2007/0078940 A1 * | 4/2007 | Fineberg | G06F 13/28 |
| | | | 709/216 |
| 2007/0128899 A1 * | 6/2007 | Mayer | G06F 9/4406 |
| | | | 439/152 |
| 2007/0186279 A1 | 8/2007 | Zimmer et al. | |
| 2008/0288556 A1 * | 11/2008 | O'Krafka | G06F 11/1482 |
| 2009/0292861 A1 * | 11/2009 | Kanevsky | G06F 3/061 |
| | | | 711/103 |

OTHER PUBLICATIONS

Gerofi et al.; "RDMA Based Replication On Multiprocessor Virtual . . . Interconnects", Cluster Computing, IEEE International Conference on, Sep. 26-30, 2011, pp. 35-44.

* cited by examiner

USING RDMA FOR FAST SYSTEM RECOVERY IN VIRTUALIZED ENVIRONMENTS

CROSS-REFERENCE TO RELATED APPLICATION

This application is a continuation of U.S. patent application Ser. No. 13/933,701, filed Jul. 2, 2013, now U.S. Pat. No. 9,146,819, issued Sep. 29, 2015, the entire contents and disclosure of which is hereby incorporated herein by reference.

BACKGROUND

This invention generally relates to computer system recovery in the case of faults or errors, and more specifically, to system recovery in a virtualized environment.

Virtual computing environments are quickly being adopted by many enterprises for a variety of data processing and storage needs. A virtual computing environment refers to a computer system in which a single physical machine may be observed as multiple virtual machines, and where a set of physical hardware resources can be used as multiple virtual resources. Each virtual machine can run its own operating system that may control the set of virtual hardware resources.

An important issue when designing a virtual computing environment is to provide for data backup and system recovery. One common way to address this issue is to use the operating system on the physical server. This approach has several disadvantages, however. For instance, with this approach, backup agents may be required on the operating system; and in many situations, each application, or each of several applications, running on the server, may need its own separate backup agent.

Backup agents are processes running on the Operating System and may require resources of the central processing unit. In a virtual environment in which, for example, ten virtual machines are running on one physical machine, the backup agents may require a significant portion of the resources of the CPU.

In order to have a fast recovery from a virtual machine fault or error, a second computer—a standby computer—may be kept in the same state as the working virtual machine. As soon as the virtual machine incurs a fault or error, the standby computer takes over. This provides a very fast recovery, but doubles the system requirements by requiring one standby system for every working system.

BRIEF SUMMARY

Embodiments of the invention provide a method, system and computer program product for recovery in a virtualized environment using remote direct memory access. In one embodiment, the method comprises operating a virtual computer system on a physical computer system, and the virtual computer system maintains in a memory area a record of a state of the virtual computer system. In this method, when defined error conditions occur on the virtual computer system, remote direct memory access (RDMA) is used to pull the record of the state of the virtual computer system from that memory area onto a standby computer system.

In an embodiment, the physical computer system includes an InfiniBand/RDMA over converged Ethernet (RoCE) for communicating between host devices and target devices of the physical computer system, and the remote direct memory access is used to pull the record of the state of the virtual computing system onto the standby computer over the InfiniBand/RoCE.

In one embodiment, the InfiniBand/RoCE is re-initialized after the defined error conditions occur, and the record of the state of the physical computer pulled over the infiniBand after the infiniBand is re-initialized.

In an embodiment, the physical computer system includes an input/output system, and this input/output system is re-initialized after the defined error conditions occur. In this embodiment, the InfiniBand/RoCE is re-initialized through the input/output system.

In one embodiment, the input/output system is re-initialized by querying a non-volatile RAM.

In an embodiment, a plurality of virtual computer systems operate on the physical computer system, and each of the virtual computer systems maintains a record of its own state. In this embodiment, when the defined error conditions occur on the virtual computer systems, remote direct memory access is used to pull the records of the states of the virtual computer systems onto one standby computer.

In one embodiment, a respective one memory area on the standby computer is reserved for each of the virtual computer systems, and the record of the state of each of the virtual computer systems is stored in the memory area on the standby computer reserved for the virtual computer system.

In an embodiment, the record of the state of the virtual computer system includes defined memory contents; and when the defined error conditions occur, remote direct memory access is used to pull these defined memory contents onto the standby computer.

In one embodiment, the record of the state of the virtual computer system includes the state of a cpu; and when the defined error conditions occur, remote direct memory access is used to pull the state of this cpu onto the standby computer.

In an embodiment, the physical computer system includes an operating system and a network interface card for providing the RDMA, and the operating system is used to re-initialize the network interface card after the defined error conditions occur.

Embodiments of the invention provide a set of methods and schemes that provide a very fast recovery from a virtual machine fault or error, while requiring much fewer resources than standard or conventional approaches to virtual machine recovery. In embodiments of the invention, one spare real computer system can be used for backing up several virtual working systems.

DETAILED DESCRIPTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
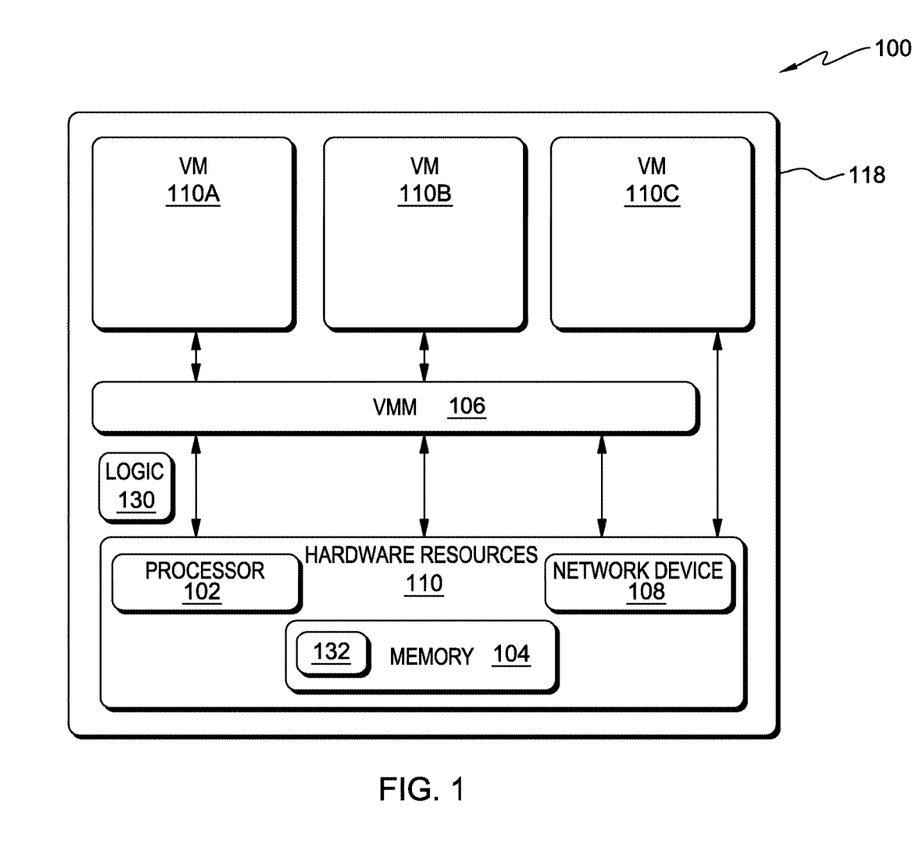
FIG. 1 is a block diagram that illustrates a computing system supporting a virtual environment according to an embodiment of the invention.

This invention relates to computer system recovery in a virtual environment, and FIG. 1 illustrates a computer system 100 that supports a virtual environment. System 100 may comprise virtual machines 110A, 110B, 110C, virtual machine monitor 106, hardware resources 110, and logic 130. Logic 130 may comprise hardware, software, or a combination of hardware and software (e.g., firmware). For example, logic 130 may comprise circuitry (i.e., one or more circuits) to perform operations described herein. For example, logic 130 may comprise one or more digital circuits, one or more analog circuits, one or more state machines, programmable logic, and/or one or more ASIC's (Application-Specific Integrated Circuits). Logic 130 may be hardwired to perform the one or more operations. Alternatively or additionally, logic 130 may be embodied in firmware, in machine-executable instructions 132 stored in a memory, such as memory 104, to perform these operations, or in various other components of system 100. Logic 130 may be used to perform various functions by various components as described herein.

Hardware resources 110 refer to physical hardware components associated with system 100 including, but not limited to, a processor 102, such as CPU (central processing unit), memory 104, and network device 108. Processor 102, host memory 104, and network device 108 may be comprised in a single circuit board, such as, for example, a system motherboard 118. Alternatively, network device 108 may be comprised in a circuit card that may be inserted into a circuit card slot. Processor 102 may comprise processing circuitry to carry out computational tasks of system 100, and for example, processor 102 may include a CPU.

Network device 108 as referred to herein relates to a device which may be coupled to a data transmission medium to transmit data to or receive data from other devices coupled to the data transmission medium. For example, network device 108 may be designed to transmit data to or receive data from devices coupled to a network such as a local area network. Such a network device may communicate with other devices according to any one of several data communication formats such as, for example, communication formats according to versions of IEEE Std. 802.3 (Ethernet), IEEE Std. 802.11, IEEE Std. 802.16, Universal Serial Bus, Firewire, asynchronous transfer mode (ATM), synchronous optical network (SONET) or synchronous digital hierarchy (SDH) standards.

Memory 104 may store machine-executable instructions 132 that are capable of being executed, and/or data capable of being accessed, operated upon, and/or manipulated by logic, such as logic 130, and/or processor, such as processor 102. The execution of program instructions 132 and/or the accessing, operation upon, and/or manipulation of this data by logic 130 for example, may result in, for example, system 100 and/or logic 130 carrying out some or all of the operations described herein. Memory 104 may, for example, comprise read only, mass storage, random access computer-accessible memory, and/or one or more other types of machine-accessible memories. This may include, for example, DRAM (dynamic random access memory) or SRAM (static random access memory), but embodiments of the invention are not so limited.

System 100 may comprise a plurality of virtual machines 110A, 110B, 110C. While only three are shown, system 100 may comprise more or less virtual machines than those illustrated. One or more virtual machines 110A, 110B, 110C may each include hardware resources 110. Hardware resources 110 may be virtualized, meaning that a single physical hardware resource 110 may be partitioned into multiple virtual hardware resources to enable system 100 to use the single physical hardware resource 110 in multiple virtual machines 110A, 110B, 110C. Virtualization may be implemented using VMM 106. In an embodiment, VMM 106 comprises software that imposes a virtualization layer in system 100 in which hardware resources 110 may be virtualized into virtual machines 110A, 110B, 110C.

Figure 2:
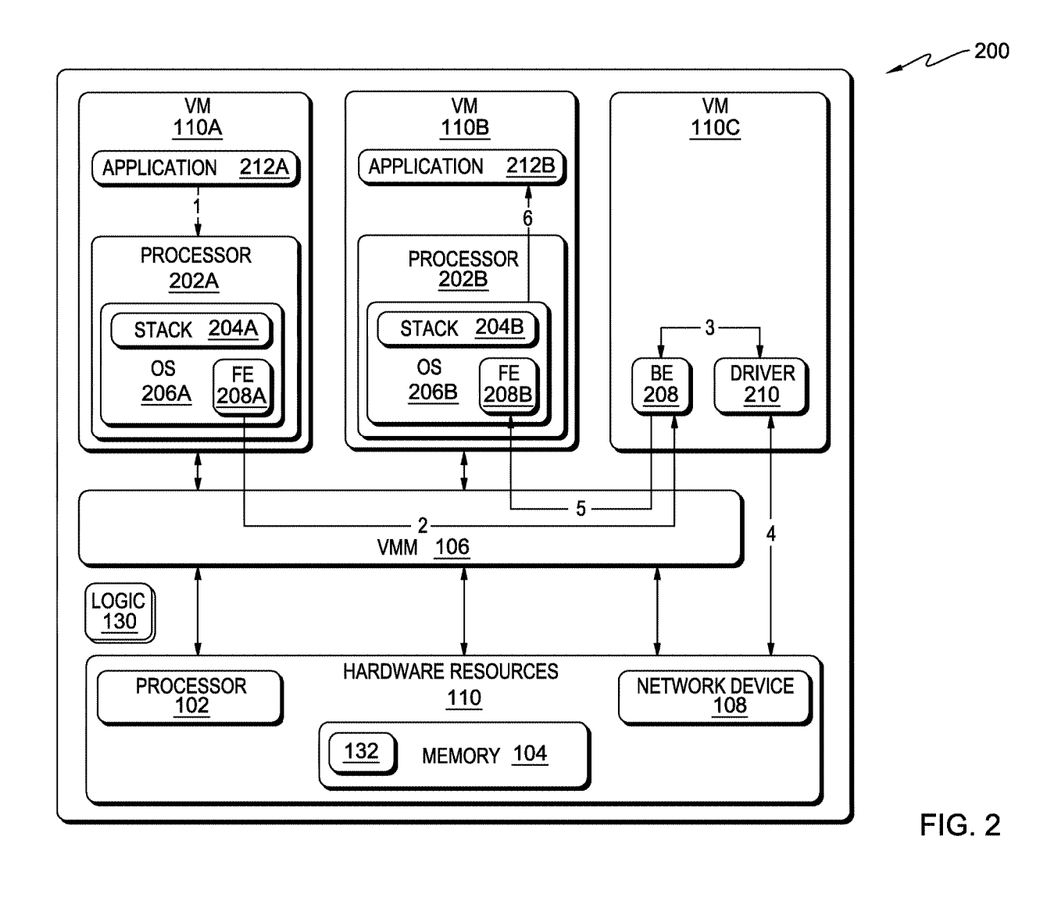
FIG. 2 is a block diagram that illustrates a virtual environment supported by the computing system shown in FIG. 1.

FIG. 2 illustrates a virtual environment system 200. In this system 200, data are typically transferred between, for example, virtual machine 110A and virtual machine 110B, by using a virtual network device, such as virtual machine 110C. Virtual machines 110A, 110B may each comprise application 212A, 212B, and virtual processor 202A, 202B. Processors 202A, 202B may each execute operating system 206A, 206B, where a network protocol stack 204A, 204B may be executed. Operating system 206A, 206B may also include a front end driver 208A, 208B to assist in the transfer of data. Virtual machine 110C may be used as a virtual network device to further assist in the transfer of data. Virtual machine 110C may include a back end driver 208 that interfaces with device driver 210, which in turn communicates with network device 108.

In conventional system 200, application 212A on virtual machine 110A may initiate data transfer by generating a message, and passing the message to network protocol stack 204A executed by operating system 206A of processor 202A (1). Once the message is passed through network stack 204A, front end driver 208A may transmit the message to back end driver 208 on virtual machine 110C (2). Back end driver 208 may communicate the message to actual network device driver 210 (3). Network device driver 210 may then communicate the message to network device 108 (4), where network device 108 may determine the destination address of the message. Upon determining that the message is to be forwarded to virtual machine 110B, network device 108 may pass the message back to device driver 210 (4), where device driver 210 may transmit to back end driver 208 (3). Back end driver 208 may then transmit the message to front end driver 208B on virtual machine 110B (destination) (5), where the message is passed up through stack 202B, and finally to application 212B.

In the operation of virtual environment 200, errors or faults occur. Some of the errors or faults are such that the system needs to be re-initialized or restarted, typically from some point referred to as a checkpoint. As mentioned above, various ways are known for system recovery in a virtual environment. For example, a standby computer may be kept in the same state as the working virtual machine; and as soon as the virtual machine fails, the standby takes over. This provides a very fast recovery, but doubles the system requirements.

Embodiments of the invention reduce the time required for restarting a virtual machine after it fails by using remote direct memory access (RDMA) operations. Instead of requiring one backup machine for each working machine and synchronizing the status of the backup and working machines with each other, embodiments of the invention use much faster RDMA operations to transfer the latest state of the working machine. The state of the working machine is essentially, for example, the content of its main memory at the last checkpoint and the cpu state at that time.

Remote Direct memory access is a technique for efficient movement of data over high-speed transport. RDMA enables a computer to directly place information in another computer's memory with minimal demands on memory bus bandwidth and CPU processing overhead, while preserving memory protection semantics. RDMA is achieved by means of a network interface card (RNIC) that provides RDMA services, and the RNIC may provide support for RDMA over the transport control protocol (TCP).

RDMA uses an operating system programming interface, referred to as "verbs," to place work requests (Rs) onto a work queue. Also, RDMA uses a technology, referred to as InfiniBand technology, or uses RDMA over converged Ethernet (RoCE), for communicating between host devices (e.g., servers, computing nodes) and target devices (e.g., I/O modules, storage devices, communication links). The InfiniBand/RoCE architecture defines a point-to-point switched "fabric" for interconnecting hosts and targets, and specifies various verbs, or functions, for establishing and maintaining communication connections between devices. Hosts are coupled to the InfiniBand fabric via Host Channel Adapters (HCA), while targets are coupled to the fabric with Target Channel Adapters (TCA).

A host maps local buffers or storage space to virtual address space within the InfiniBand fabric by invoking verbs implemented by an HCA. The host then communicates to the target, out of band, the virtual address space to use for a particular communication connection between the host and the target. A TCA coupled to the target device maintains the state of the connection and performs RDMA to the host buffers via the specified InfiniBand virtual address space.

Verbs specified in the InfiniBand architecture allow a host (via an HCA) to set up a virtual address space for a communication connection and to add or remove host buffers to/from the virtual address space. For example, a host may invoke a first "register" function, while identifying a set of host buffers. Other verb functions (e.g., "re-register", "de-register") allow the host to add and remove host buffers to and from a virtual address space.

Figure 3:
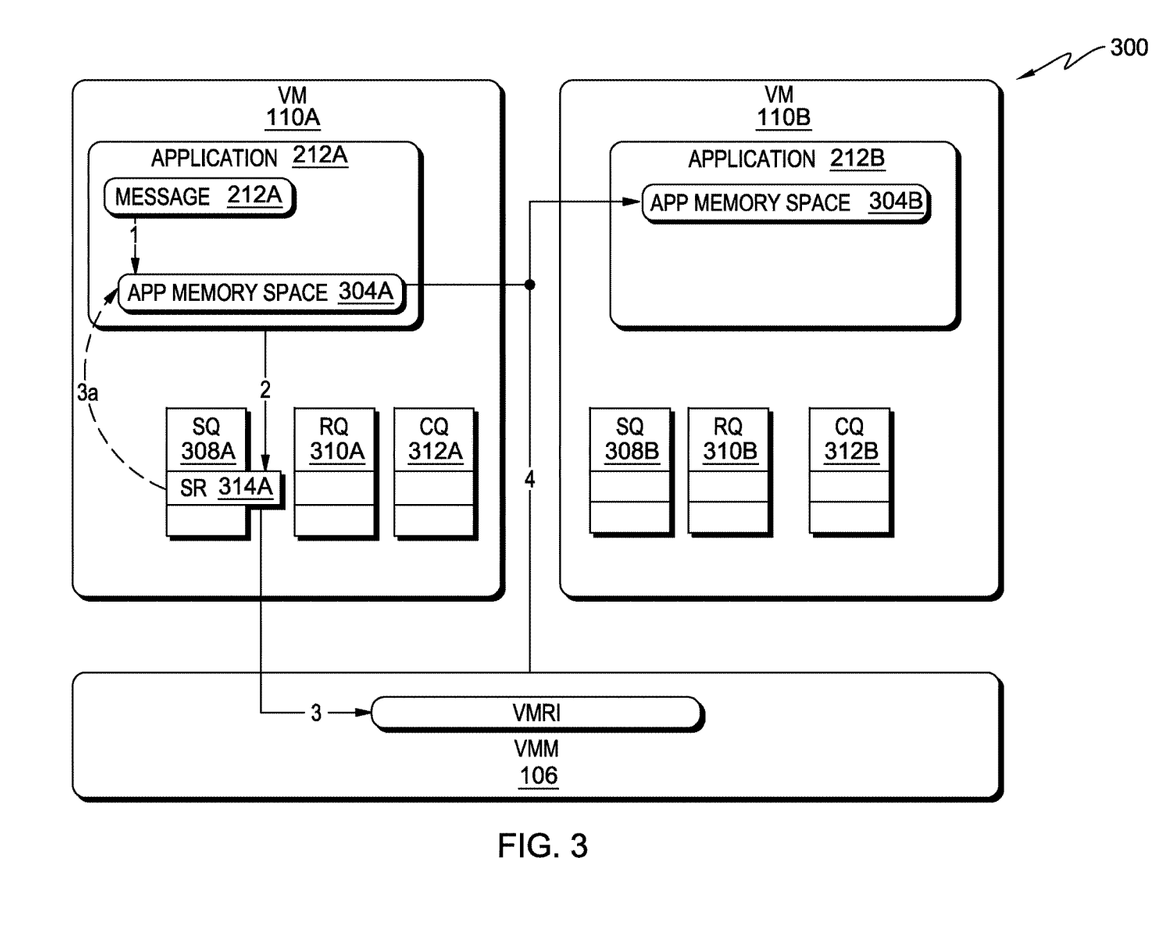
FIG. 3 illustrates data transfer operations in the virtual environment of FIG. 2.

FIG. 3 illustrates procedures for transferring data between the virtual machines 110A and 110B using RDMA. With reference to FIG. 3, source application 212A may generate a message 306, and may store message 306 (1) in a send buffer of an application memory space 304A. A message may comprise data and control information to indicate, for example, what to do with the data. Application memory space 304A may be comprised in, for example, an SRAM memory, or a DRAM memory, such as memory 104. Application 212A may generate send request 314A, and post send request 314A to send queue 308A (2). Send request 314A may include information about message 306, such as an address at which message 306 is stored, and may also include information about the send request 314A itself, such as the request type (i.e., SEND), and the length of the request.

In an embodiment, VMRI (virtual machine RDMA interface) 302 may detect that a send request 314A has been posted to send queue 308A, indicating to VMRI 302 that a message 306 has been placed in a send buffer of application memory space 304A. VMRI 302 refers to an interface that may be called by operating systems 206A, 206B of virtual machines 110A, 110B. VMRI 302 may be implemented in any combination of software and hardware. In an embodiment, VMRI 302 is presented as a service of VMM 106. VMRI 302 may be based, at least in part, on RDMA semantics as defined by any of several RDMA-based protocols.

When source application 212A wishes to send data to destination application 212B, source application 212A may perform one or more operations that result in operating system 206A calling VMRI 302. When VMRI is called, it may set-up queue pairs between the source application 212A and the destination application 212B, including send queues 308A, 308B, receive queues 310A, 310B, and completion queues 312A, 312B. The queue pairs are set-up such that each send queue 308A, 308B has a corresponding receive queue 310A, 310B, and a corresponding completion queue 312A, 312B. For example, send queue 308A may correspond with receive queue 310B (and send queue 308B may correspond to receive queue 310A). These are described in more detail below.

Message 306 may also be transferred from virtual machine 110A to virtual machine 110B by bypassing use of either operating system 206A, 206B (not shown in FIG. 3 since they are not used) by directly placing message 306 in application memory space 304B from which application 212B may retrieve message 306. Processing of message by operating system may include, but is not limited to, for example, passing message through a network protocol stack, and copying message to one or more intermediate (not source or destination) buffers. VMRI 302 may read send request 314A from send queue 308A (3), and retrieve message 306 from send buffer in application memory space 304A. VMRI 302 may then directly transfer message 306 to application memory space 304B of destination application 212B (4).

Figure 4:
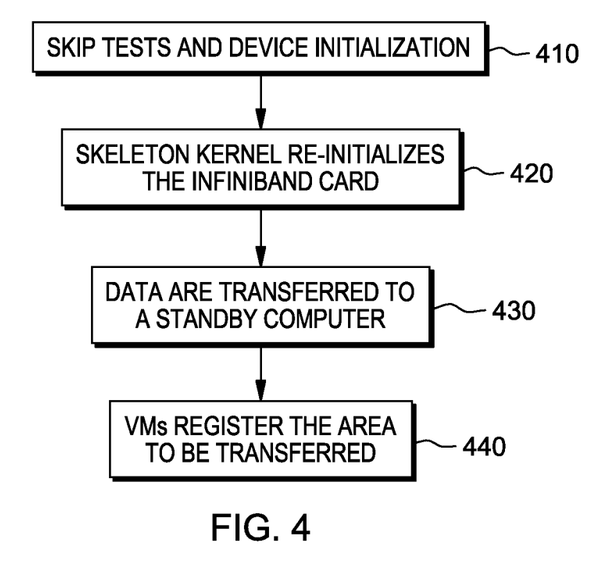
FIG. 4 shows a procedure for recovery of system error in a virtual environment according to an embodiment of the invention.

FIG. 4 illustrates a procedure using RDMA to recover from a defined system error or fault. In this procedure, in embodiments of the invention, computer system 100 includes a basic input/output system (BIOS) designed for fast initialization or re-initialization by querying non-volatile RAM (NVRAM).

In the procedure shown in FIG. 4, at step 410, the BIOS skips all the tests and initialization, and at step 420, a skeleton kernel in the Operating system re-initializes the InfiniBand/RoCE. After the InfiniBand/RoCE is re-initialized, at step 430, data are transferred to a standby computer using RDMA. In this process, each VM, as represented at 440, registers the area to be transferred.

In embodiments of the invention, assurance is provided that the network fabric is powered on. In addition, in embodiments of the invention, if power is maintained to the InfiniBand/RoCE card without going through the BIOS, then even the minimal BIOS re-initialization is not required.

In embodiments of the invention, the use of RDMA can protect against soft, host errors or failures, or temporary power loses that result in system failures.

Embodiments of the invention provide a number of important advantages. For instance, it is expected that in the future, there will be as much as 64 GB to 128 GB of virtual machine on a physical host. Transferring 128 GB out of persistent memory instead of disk, should be much faster. In addition, with the present invention, there is no longer need to maintain a one-to-one relationship between primary host and a ready, standby host.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments disclosed herein were chosen and described in order to explain the principles and application of the invention, and to enable those of ordinary skill in the art to understand the invention for various embodiments with various modifications as are suited to the particular use contemplated.

What is claimed is:

1. A method of system recovery in a virtualized computing environment operating on a physical computer system, using remote direct memory access, the method comprising:
    operating a virtual computer system on the physical computer system, including the virtual computer system maintaining a record of a state of the virtual computer system at each of a series of checkpoints; and
    when defined error conditions occur on the virtual computer system, initializing a system recovery procedure for pushing the record of the state of the virtual computer system at one of the checkpoints onto a standby computer system using remote direct memory access, including
        re-initializing an input/output system of the physical computer system,
        the virtual computer system placing a message in a send buffer in a memory space of the virtual computer system, generating a send request, and posting the send request in a send queue to indicate that the message has been placed in the send buffer, wherein the message comprises data and control information for the data, and the send request includes information about the message, and
        calling a virtual system interface to send the message to the standby computer system; and wherein:
    the physical computer system includes an infiniBand for communicating between host devices and target devices of the physical computer system; and
    the pushing the record of the state of the virtual computing system includes pushing said record over the infiniBand, including re-initializing the infiniBand after said defined error conditions occur, and pushing said record over the infiniBand after said re-initializing the infiniBand.

2. The method according to claim 1, further comprising the virtual system interface detecting that the send request has been posted to the send queue.

3. The method according to claim 1, wherein the calling a virtual system interface includes the virtual system interface reading the send request, retrieving the message, and transferring the message to a memory space of the standby computer system.

4. The method according to claim 1, wherein the standby computer system is another virtual computer system.

5. The method according to claim 1, wherein:
the re-initializing the input/output system includes re-initializing the input/output system after said defined error conditions occur.

6. The method according to claim 5, wherein:
the re-initializing the infiniBand includes re-initializing the infiniBand through the input/output system; and
the re-initializing the input/output system includes re-initializing the input/output system by querying a non-volatile RAM.

7. The method according to claim 1, wherein:
the operating a virtual computer system includes operating a plurality of virtual computer systems on the physical computer system, each of the virtual computer systems maintaining a record of a state of said each virtual computer system at each of a series of checkpoints;
the pushing includes, when the defined error conditions occur on the virtual computer systems, pushing the states of the virtual computer systems onto the standby computer;
a respective one memory area on the standby computer is reserved for each of the virtual computer systems; and
the pushing includes pushing the record of each of the virtual machines onto the one memory area on the standby computer reserved for said each virtual computer.

8. The method according to claim 1, wherein:
the virtual computer system has defined memory contents and a defined cpu state; and
the pushing the record includes pushing said defined memory contents and the defined cpu contents onto the standby computer.

9. The method according to claim 8, wherein the computer system includes an Operating System and a Network Interface card for providing the RDMA, and the method further comprises using the Operating System to re-initialize the Network Interface card after the defined error conditions occur.

10. A recovery system for recovery in a virtualized computing environment operating on a physical computer system, using remote direct memory access, wherein a virtual computer system maintains a record of a state of the virtual computer system at each of a series of checkpoints, the recovery system comprising:
one or more processing units configured for:
pushing the record of the state of the virtual computer system at one of the checkpoints onto a standby computer system using remote direct memory access when defined error conditions occur on the virtual computer system, including
re-initializing an input/output system of the physical computer system,
the virtual computer system placing a message in a send buffer in a memory space of the virtual computer system, generating a send request, and posting the send request in a send queue to indicate that the message has been placed in the send buffer, wherein the message comprises data and control information for the data, and the send request includes information about the message, and
calling a virtual system interface to send the message to the standby computer system; and wherein:
the physical computer system includes an infiniBand for communicating between host devices and target devices of the physical computer system; and
the pushing the record of the state of the virtual computing system includes pushing said record over the infiniBand, including re-initializing the infiniBand after said defined error conditions occur, and pushing said record over the infiniBand after said re-initializing the infiniBand.

11. The recovery system according to claim 10, wherein the one or more processing units are further configured for:
re-initializing the input/output system after said defined error conditions occur; and
re-initializing the infiniBand through the input/output system.

12. The recovery system according to claim 10, wherein a plurality of virtual computer systems operate on the physical computer system, each of the virtual computer systems maintaining a record of a state of said each virtual computer system at each of a series of checkpoints, a respective one memory area on the standby computer is reserved for each of the virtual computer systems, and the one or more processing units are configured for:
pushing the record of each of the virtual machines onto the one memory area on the standby computer reserved for said each virtual computer when the defined error conditions occur on the virtual computer systems.

13. An article of manufacture comprising:
at least one tangible computer readable hardware device having computer readable program code logic tangibly embodied therein to provide recovery in a virtualized computing environment operating on a physical computer system, using remote direct memory access, wherein a virtual computer system maintains a record of a state of the virtual computer system at each of a series of checkpoints, the computer readable program code logic, when executing on a computer:
pushing the record of the state of the virtual computer system at one of the checkpoints onto a standby computer system using remote direct memory access when defined error conditions occur on the virtual computer system, including re-initializing an input/output system of the physical computer system,
the virtual computer system placing a message in a send buffer in a memory space of the virtual computer system, generating a send request, and posting the send request in a send queue to indicate that the message has been placed in the send buffer, wherein the message comprises data and control information for the data, and the send request includes information about the message, and
calling a virtual system interface to send the message to the standby computer system; and wherein:
the physical computer system includes an infiniBand for communicating between host devices and target devices of the physical computer system; and
the pushing the record of the state of the virtual computing system includes pushing said record over the infiniBand, including re-initializing the infiniBand after said defined error conditions occur, and pushing said record over the infiniBand after said re-initializing the infiniBand.

14. The article of manufacture according to claim 13, the program code logic, when executing on the computer:
re-initializing the input/output system after said defined error conditions occur; and
re-initializing the infiniBand through the input/output system.

15. The article of manufacture according to claim 13, wherein a plurality of virtual computer systems operate on the physical computer system, each of the virtual computer systems maintaining a record of a state of said each virtual computer system at each of a series of checkpoints, a respective one memory area on the standby computer is reserved for each of the virtual computer systems, and the program code logic, when executing:

pushing the record of each of the virtual machines onto the one memory area on the standby computer reserved for said each virtual computer when the defined error conditions occur on the virtual computer systems.

* * * * *